United States Patent
Robison et al.

(10) Patent No.: US 6,805,623 B2
(45) Date of Patent: Oct. 19, 2004

(54) APPARATUS FOR PROVIDING AIR FLOW WITHIN A VEHICLE

(75) Inventors: Jerry L. Robison, Findlay, OH (US); Roger E. Clark, Mount Blanchard, OH (US)

(73) Assignee: Thermo Fan LLC, Findlay, OH (US)

( * ) Notice: Subject to any disclaimer, the term of this patent is extended or adjusted under 35 U.S.C. 154(b) by 110 days.

(21) Appl. No.: 10/315,516

(22) Filed: Dec. 10, 2002

(65) Prior Publication Data

US 2004/0121719 A1 Jun. 24, 2004

(51) Int. Cl.[7] .................................................. B60H 1/26
(52) U.S. Cl. ...................................... 454/143; 454/338
(58) Field of Search ........................... 454/84, 108, 139, 454/112, 143, 151, 158, 207, 208, 338

(56) References Cited

U.S. PATENT DOCUMENTS

| | | |
|---|---|---|
| 1,898,859 A | 2/1933 | Thorp |
| 2,008,965 A | 7/1935 | Miller |
| 2,582,356 A | 1/1952 | Rauhut |
| 2,619,021 A | 11/1952 | Pfautsch |
| 2,640,411 A | 6/1953 | Hans |
| 3,018,711 A | 1/1962 | Welch et al. |
| 3,195,440 A | 7/1965 | Coscione et al. |
| 3,532,377 A | 10/1970 | Grasseler |
| 3,603,238 A | 9/1971 | Anderson |
| 4,088,364 A | 5/1978 | Termont |
| 4,120,527 A | 10/1978 | Lawrence |
| 4,580,486 A | 4/1986 | Schulz |
| 4,741,256 A | 5/1988 | Huang |
| 5,044,258 A | 9/1991 | Wu et al. |
| 5,094,151 A | 3/1992 | Bernard |
| 5,370,576 A | 12/1994 | Krofchalk |
| 5,588,909 A | 12/1996 | Ferng |
| 6,142,865 A | 11/2000 | Noblet et al. |
| 6,224,479 B1 | 5/2001 | Lino |

FOREIGN PATENT DOCUMENTS

| | | |
|---|---|---|
| GB | 363152 | 12/1931 |
| GB | 2 215 034 A | 9/1989 |
| JP | 362 210119 A | 9/1987 |

Primary Examiner—Jiping Lu
(74) Attorney, Agent, or Firm—Mueller and Smith, LPA (57) ABSTRACT

Apparatus for providing airflow within a vehicle. A first housing portion is mounted over a vehicle vent which defines an internal plenum dimensioned to receive the manually adjustable vent handle. A second adjacent plenum is defined by a second housing portion which extends to a fan port at which are mounted one or more battery powered electric motor driven fans. These fans are mounted pivotally as is the mount upon which they are supported. The apparatus may employ Pelfier devices for interior air temperature enhancements. One heatsink of these thermal devices is located within that plenum communicating with ambient or outside air, while the oppositely disposed interior air treatment heatsink is located within an adjacent forwardly positioned plenum. A low battery detector and annunciator assures maintenance of the vehicle battery power supply.

31 Claims, 8 Drawing Sheets

APPARATUS FOR PROVIDING AIR FLOW WITHIN A VEHICLE

BACKGROUND OF THE INVENTION

Typical long-haul trucks of the so-called "eighteen wheeler semi" variety incorporate a sleeper cab just rearwardly of the drivers' station. The trucks generally are actively driven over extended periods of time ranging from days to weeks. During these trips the driver or drivers attempt sleep in the sleeper cab for about an eight hour layover interval. These layovers will occur during hot as well as cold weather conditions and generally are accompanied by a corresponding eight hour engine idling interval so that the air conditioning or heating systems can remain active. The cab windows are closed for safety and insect avoidance. During mild weather drivers continue to attempt sleep with the cab windows closed for the noted purposes. Truck vents are inadequate to ventilate the cabs under such conditions and, accordingly, the truck engine is idled, again to power the cab climate control system.

Operational costs associated with layover engine idling are substantial. In this regard, a diesel truck engine idling will consume about one to three gallons of fuel per hour. Assuming a typical six layover trip on highways with an idling interval of eight hours, the engine will consume from about 48 to 144 gallons of fuel in support of the rest intervals for the trip. Engine wear is an unaccountable aspect of the idling practice, but assuredly represents an additional operational cost.

A variety of alternatives to sleepover idling have been implemented or proposed. Those which have been considered effective generally have been deemed too costly by truck owners. Less costly approaches, in turn, generally have not succeeded in the marketplace. For example, small, petroleum fuel-based engine powered air conditioners have been mounted on the trucks. Engine cycling systems have been employed and small fan assemblies mountable within the door vents and powered from the truck battery have been proposed. For the latter approach, the capacity of the truck battery comes into play. Waking in the morning to confront a dead battery is not a pleasant experience for the driver. The alternative of awaking periodically during the sleep interval to restart the truck engine and charge the battery results in a sleep deficit layover, a condition perforce worse than idling the engine all night.

Thus, the problem posed by the industry is one calling for the development of a relatively inexpensive, compact and effective auxiliary heating, ventilating and air conditioning mechanism for vehicles.

BRIEF SUMMARY OF THE INVENTION

The present invention is addressed to apparatus for providing air flow within a vehicle utilizing battery power. Mounted over a vent of the vehicle, the apparatus utilizes two plenum defining housing portions. That housing portion most adjacent the vehicle vent includes an air entrance-exit port of size sufficient to admit the vehicle vent handle for carrying out manual adjustment of the vent from the interior of the vehicle. A second housing portion defines a second plenum which may communicate with the first plenum for the purpose of mixing external or ambient air with the air of the vehicles' interior.

One or more battery powered electric motor driven fans are pivotally mounted at the forward face of the second housing portion. By employing a pivotal mount for the fans, airflow direction within the vehicle can be adjusted to the extent that it can be reversed. These fans additionally are supported upon a fan mount which itself may be pivoted into a variety of orientations which additionally permit user hand access to the plenum surmounted vent handle.

Heating or cooling of vehicle interior air can be enhanced through the incorporation of one or more arrays of battery powered Peltier thermal devices. These devices are mounted intermediate oppositely disposed heatsinks such that one heatsink is in thermal exchange communication with air in the outer plenum for circulation as interior air. The oppositely disposed heatsink resides in the opposite plenum for heat transfer communication with ambient air through the vehicle vent.

To permit operator sleep without necessity of awakening to check the status of the vehicle battery, the apparatus incorporates a low voltage detector and annunciator to awaken the operator only upon the occasion of a low battery condition.

Other objects of the invention will, in part, be obvious and will, in part, appear hereinafter.

The invention, accordingly, comprises the apparatus possessing the construction, combination of elements and arrangement parts which are exemplified in the following detailed description.

For a fuller understanding of the nature and objects of the invention, reference should be made to the following detailed description taken in connection with the accompanying drawings.

DETAILED DESCRIPTION OF THE INVENTION

Figure 1:
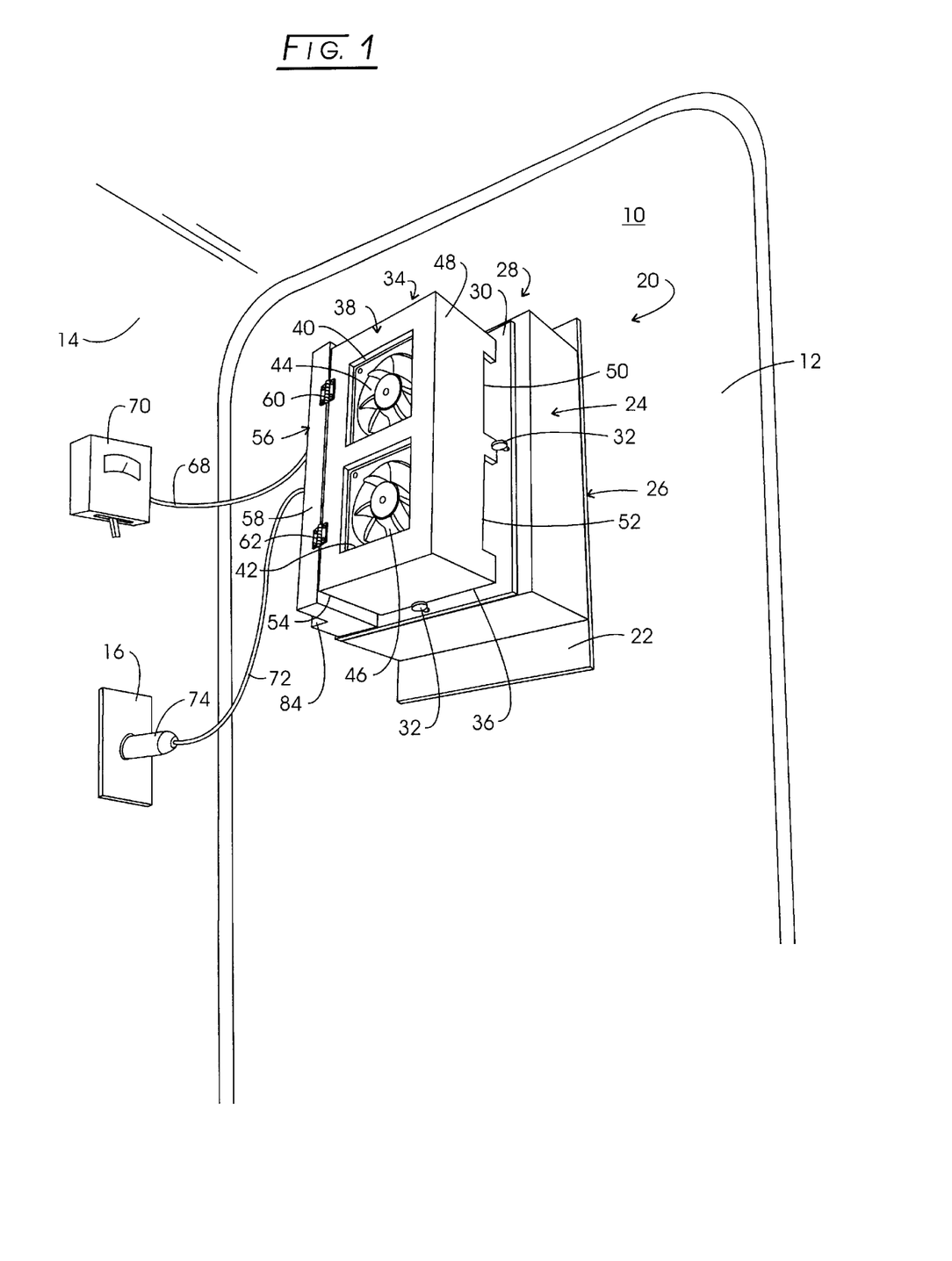
FIG. 1 is a perspective view of one embodiment of apparatus according to the invention shown mounted within a sleeper cab.

Referring to FIG. 1, perspective representation is provided of the interior of a vehicle such as a commercial freight hauling vehicle, recreational vehicle or the like. These vehicles are characterized in having one wall, for example, a side wall through which a vent is provided for communicating ambient or outside air into the vehicle interior 10. Interior 10 also is represented having a back wall 14 which contains an outlet 16 configured as a cigar lighter implement. Those implements are coupled with the electrical power supply of the vehicle and, in the absence of motor operation are powered from the battery of the vehicle. Currently, that power supply is provided at 12 volts. Interior 10 is configured in the manner of a sleeper cab. Mounted against side wall 12 and over a manually operated vent is an air handling or air flow apparatus represented generally at 20. Apparatus 20 is, in general, configured having a mounting back plate 22 positioned against the interior surface of side wall 12. Configured with the back plate 22 is a housing or housing portion 24 which extends from an engagement side represented generally at 26 having a periphery at least coextensive with the corresponding periphery of the vent within side wall 12 (not shown). Housing 24 extends to an output side represented generally at 28. Removably attached to the output side 28 is a flat support frame 30. Attachment of the support frame 30 with the output side 28 is provided with thumb screws certain of which are identified at 32.

A second housing or second housing portion is represented generally at 34 which is positioned upon housing 24. Housing 34 is provided having an engagement edge 36 shown in freely abutting contact with the outward surface of frame 30. From engagement edge 36, of housing 34 extends outwardly to a fan support side represented generally at 38. Extending through the fan support side 38 are two rectangular fan ports 40 and 42. Pivotally mounted within the respective ports 40 and 42 are d.c. electric motor driven fans shown respectively at 44 and 46. Note that side 48 of the second housing 34 is configured having two air intake ports 50 and 52 formed as rectangular notches extending from engagement edge 36. Ports 50 and 52 are provided for air transfer communication with air within the cab vehicle interior 10.

Figure 2:
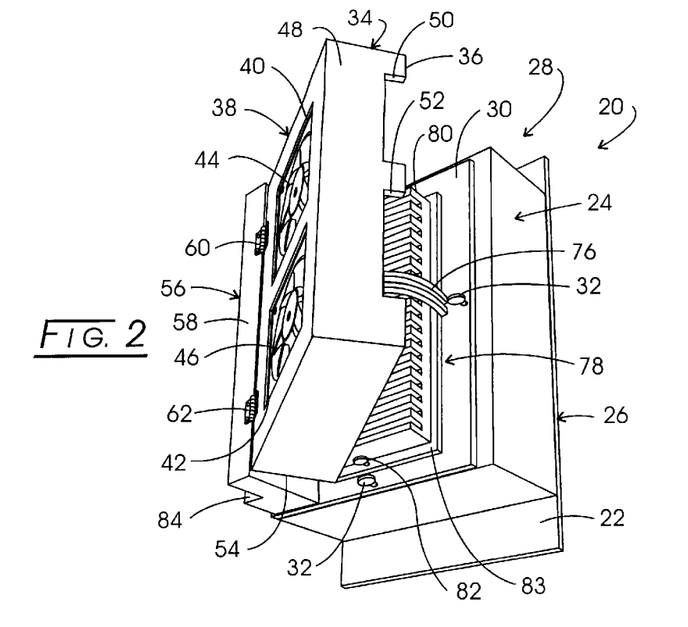
FIG. 2 is a perspective view of the apparatus of FIG. 1 showing a forward housing portion in a pivotally partially open orientation.
Figure 3:
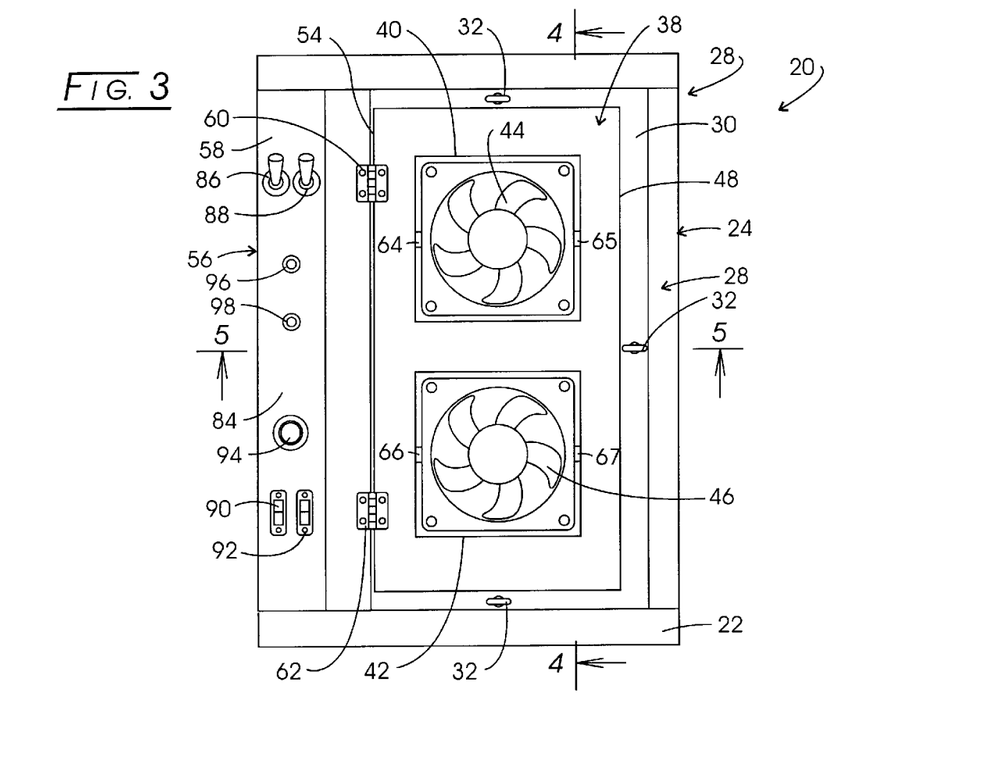
FIG. 3 is a front view of the apparatus of FIG. 1.

Looking additionally to FIGS. 2 and 3, extending along side 54 of the housing 34 is a control housing represented generally at 56. Mounted upon housing 24, the control housing 56 extends outwardly to a pivot support surface 58. This surface 58, in turn, supports one side of each of two hinges 60 and 62, the opposite sides of which are coupled with fan support side 38 of second housing 34. As illustrated in FIG. 2, with this arrangement, the user may pivot the second housing outwardly both for interior access purposes and to adjust the orientation of the electric motor driven fans 44 and 46. In the latter regard, it may be observed in FIG. 3 that the fans are pivotally mounted within the fan ports 40 and 42. Pivot connections 64 and 65 are seen mounting fan 44 and corresponding pivot connections 66 and 67 are seen mounting fan 46. With the arrangement, the direction of driven air flow can be reversed with respect to each of the fans 44 and 46 and the direction of air flow can be adjusted to suit the convenience of the user. FIG. 1 reveals that the control housing 56 is connected via cable 68 to a thermostat 70 mounted upon wall 14 and that a power cable 72 extends from housing 56 to a plug or fixture 74 which in turn is coupled in power supply connection with outlet 16.

Returning to FIG. 2, second housing 34 is seen to be retained in a user selected open orientation by a flexible polymeric strap form of latch 76. The open orientation shown reveals the presence of a removable Peltier heating or cooling assembly represented generally at 78. One heatsink or coolsink of assembly 78 is revealed at 80 and the assembly 78 is removably mounted by frame 83 to within frame 30 by thumb screws one of which is shown in the instant figure at 82. For convenience, whether functioning as a heatsink or coldsink, the devices as at 80 are described herein as "heatsinks".

Looking again to FIG. 3, mounted upon the control surface 84 of control console 56 is a switch 86 for energizing the Peltier assembly 78; a switch 88 for controlling the directional sense of current supplied to assembly 78; a switch 90 for energizing fan 44; and a switch 92 for energizing electric motor driven fan 46. A rheostat adjustment knob 94 may be manipulated by the user by the user to control the rotational speed of fans 44 and 46. An electrical socket 96 is provided for receiving thermostat cable 68 and, correspondingly, an electrical socket 98 is provided for receiving power cable 72 (FIG. 1).

Figure 4:
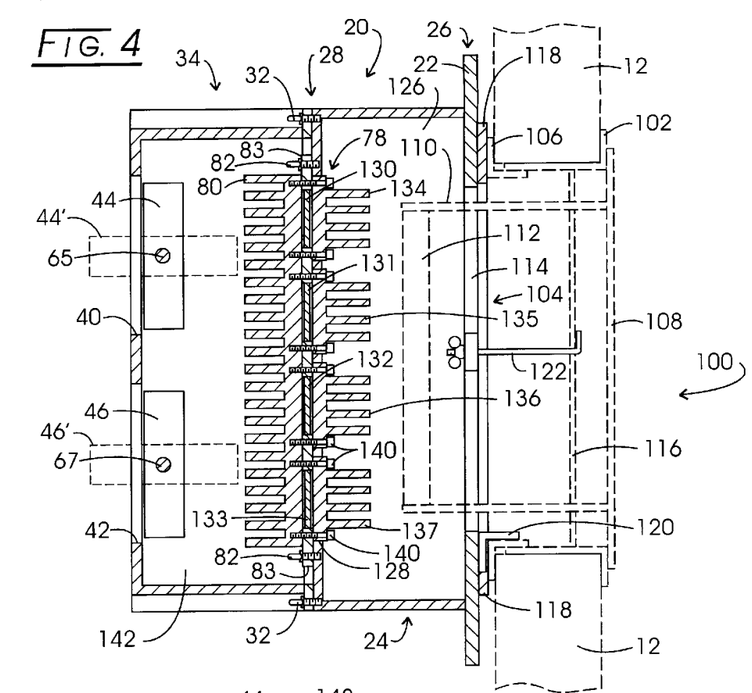
FIG. 4 is a sectional view taken through the plane 4—4 in FIG. 3.
Figure 5:
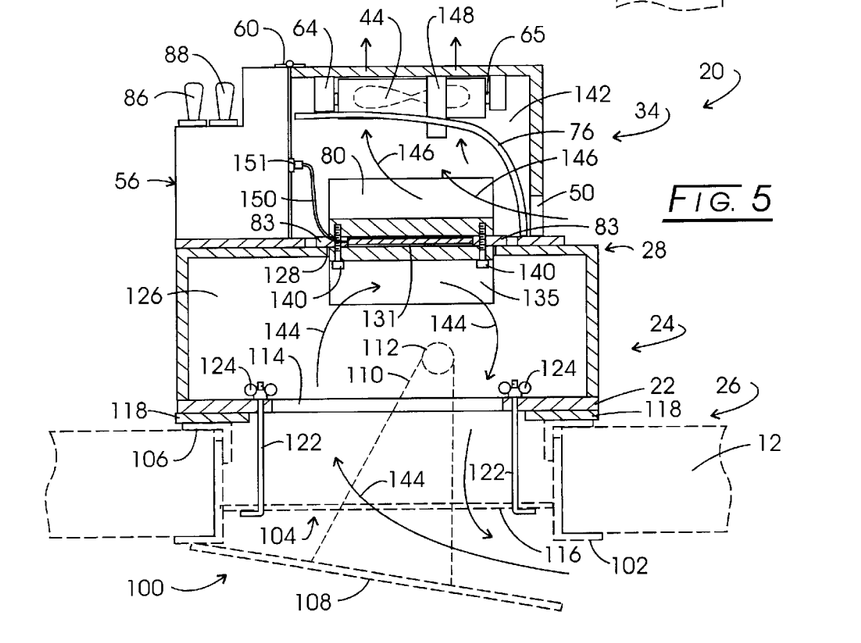
FIG. 5 is a sectional view taken through the plane 5—5 in FIG. 3.

Looking to FIGS. 4 and 5, the internal features of apparatus 20 are revealed, particularly as they are associated with a conventional sleeper cab vent. In these figures, sidewall 12 reappears in phantom in conjunction with a vent represented generally at 100. Vent 100 is seen to be configured with an angle-shaped outer bezel 102 surmounting a vent opening 104. In similar fashion, an angular interior bezel 106 defines the internal periphery of opening 104. Vent 100 is formed with a damper assembly or vane 108 which is shown in a closed orientation in FIG. 4. Note that the vane 108 may be manipulated by the user by grasping and manipulabng an inwardly disposed handle 110, the hand graspable portion of which is shown at 112. Note that the handle 110 and hand graspable portion 112 extend through a rectangular port 114 located within the engagement side 26 of housing 24. It may be observed that engagement side 26 is at least coextensive with the vent opening 104. Vent opening 104 is protected by a metal screen 116. Apparatus 20 is mounted against the rectangular inner bezel 106 of the vent in conjunction with a rectangular rubber gasket 118 and a metal angle 120 (FIG. 4). One face of angle 20 is seen to rest against the lower portion of the vent bezel 106. Apparatus 20 is retained in the orientation shown by J-bolts certain of which are revealed at 122 which engage openings within screen 116 and extend to connection with frame or back plate 22. Thumb nuts, certain of which are identified at 144 are used to complete this coupling. FIGS. 4 and 5 reveal that housing 24 incorporates a first plenum 126 which extends from the rectangular port 114 to a rectangular access opening 128 within output side 28. In general, the access opening 128 will have dimensions permitting the user to grasp and manipulate the vent handle 110 when the second housing 34 is pivoted away from engagement with output side 28 and the Peltier assembly 78 is removed.

As seen in FIG. 4, this Pelter assemblage is formed of an array of thermal devices 130–133. Devices 130–133 may be provided as thermoelectric cooling modules (TEC) or type TES. These modules are semiconductor-based electronic components which function as small heat pumps. By applying d.c. power to such a thermal device, heat will be transferred from one side of the module to the other to create a cold and a hot side. The devices are widely used in industrial, residential and medical environments. Each of the thermal devices 130–133 is securely coupled with an inwardly depending heatsink as shown respectively at 134–137 extending into the first plenum 126. The opposite face of each of the thermal devices 130–133 is securely coupled to the earlier-described heatsink 80. Connection is seen to be made with machine screws certain of which are identified at 140.

Note that, when assuming the orientation shown in FIGS. 1, 4 and 5, second housing 34 also defines a second plenum 142 into which heatsink 80 protrudes. As shown in FIG. 5, external ambient air is permitted to pass in heat exchange relationship with the heatsinks 134–137, such air passage being represented by arrows 144 in FIG. 5. Vehicle internal air is drawn through vents as at 50 and 52 (FIG. 1) by fans 44 and 46 for heat exchange contact with heatsink 80 as represented by arrows 146 in FIG. 5. Note in that figure that the second housing 34 is retained in the closed orientation by strap latch 76 as it engages a slot in a downwardly protruding latch post 148. The figure also reveals a hand un-pluggable electrical cable assembly 150 extending from a spade connector 151 on control housing 56 to electrical connection with the array of thermal devices 130–134.

FIG. 4 further reveals the pivotal adjustability of the fans 44 and 46. In this regard, fan 44 is shown in phantom at 44' having been pivoted 90°. Similarly, fan 46 is shown in phantom at 46' having been similarly pivoted.

Figure 6:
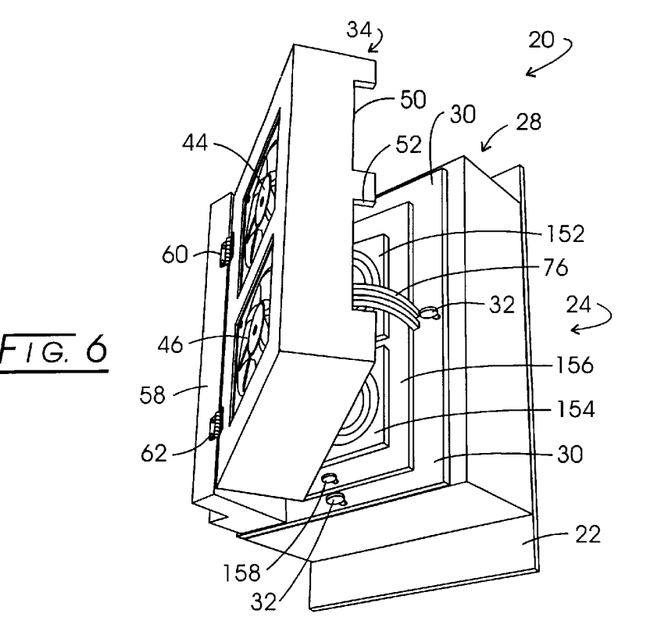
FIG. 6 is a perspective view similar to FIG. 2 but showing a replacement of a Peltier assemblage with a filter assemblage.
Figure 7:
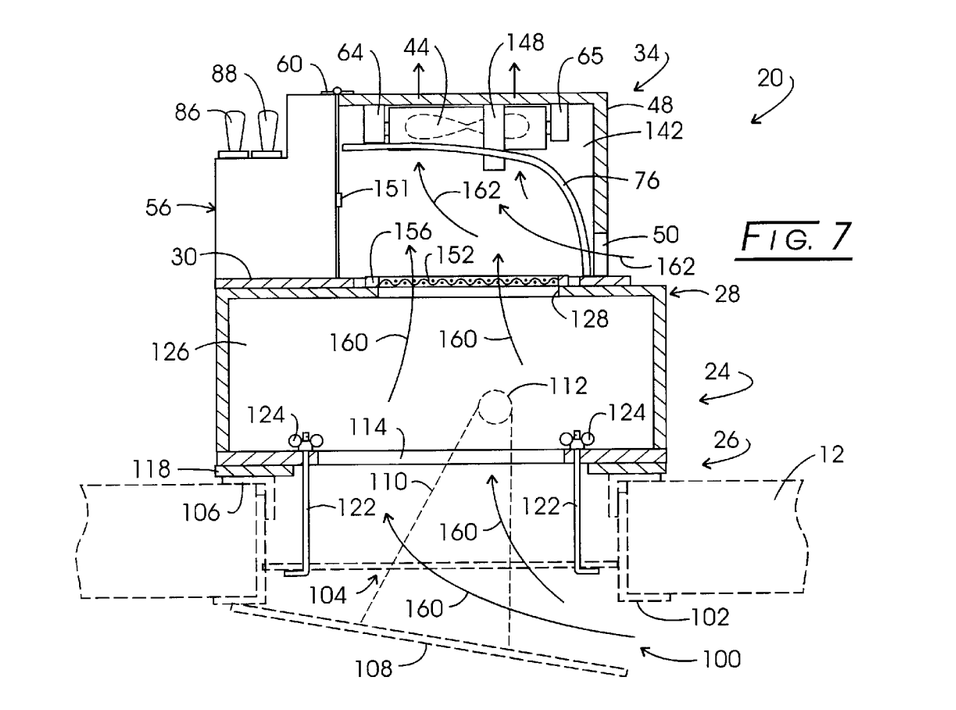
FIG. 7 is a sectional view of the apparatus shown in FIG. 6.

Referring to FIGS. 6 and 7, an embodiment for the apparatus 20 is illustrated wherein the arrayed thermal devices and associated heatsinks are removed and one or more filters as at 152 and 154 are mounted over the access opening 128. For convenience of illustration, the same identifying numeration is carried over to these figures from FIGS. 1–5. Filters 152 and 154 are mounted upon a frame 156 which extends over access opening 128. It has been determined that improved fan performance is achieved by so spacing the filters 152 and 154 from fans 44 and 46. Frame 156 is removably retained in position by thumb screws one of which is revealed at 158 in FIG. 6. FIG. 7 illustrates a mixing form of air transfer activity. In this regard, arrows 160 depict the movement of ambient or external air through the filters and into the second plenum 142. Additionally, however, arrows 162 reveal the movement of vehicle interior air through air intake ports as at 50 and 52.

Figure 8:
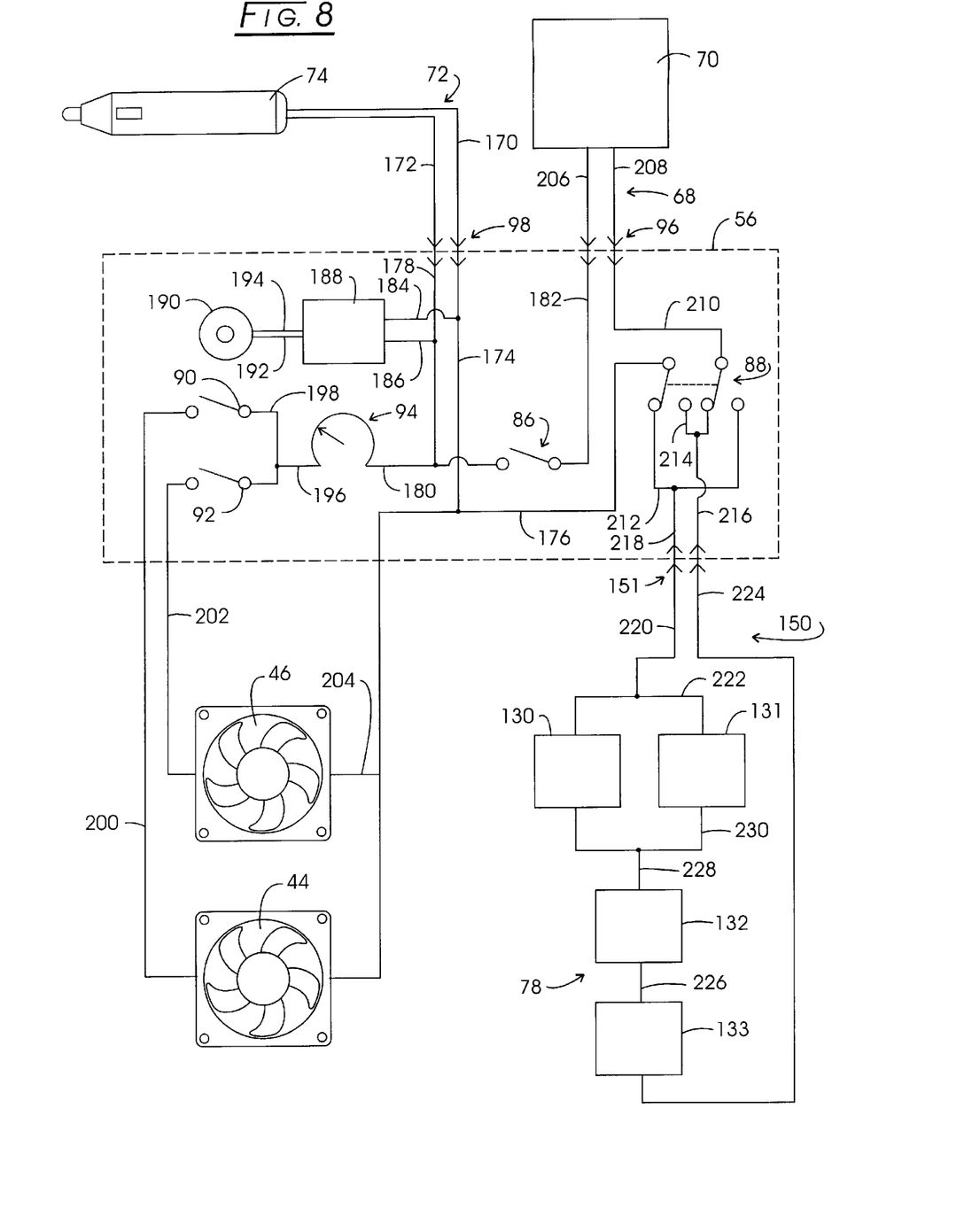
FIG. 8 is an electrical schematic drawing of a control circuit and associated components of the apparatus of the invention.
Figure 9:
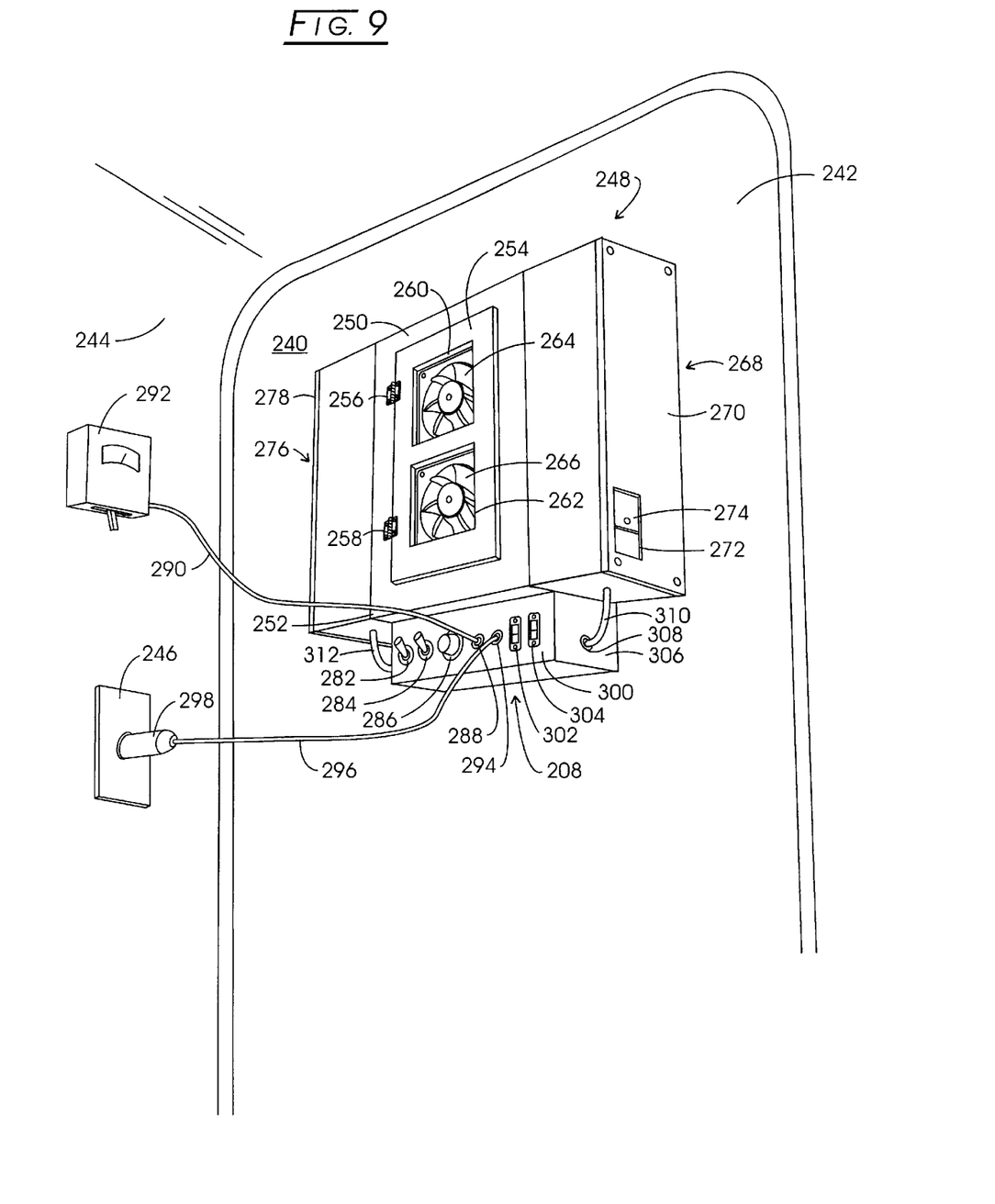
FIG. 9 is a perspective view of a preferred embodiment of an air handling apparatus according to the invention showing the apparatus mounted within a sleeper cab.

Referring to FIG. 8, a schematic representation of the control circuit employable with the air handling apparatus of the invention is provided. In the figure, fused plug 74 reappears in conjunction with leads 170 and 172 carrying, for example, +12V and ground. Leads 170 and 172 extend to connector 98 at control console 88. From connector 98, lead 170 extends as line 174 to line 176, while lead 172 extends as line 178 to line 180. Line 180 extends to one side of on/off switch 86 the opposite side of which is coupled to line 182. Lines 174 and 178 are coupled via respective branch lines 184 and 186 to a low battery voltage sensing circuit represented at block 188. Accordingly, during a sleep interval, a user may be apprised that the battery status is in jeopardy. Where a low battery threshold is reached, then an aural cue is provided from an annunciator 190 by energization via lines 192 and 194.

Line 180, extending from line 178, is coupled to rheostat 94. From the opposite side of rheostat 94 line 196 extends via line 198 to fan switches 90 and 92. The opposite side of switch 90 is seen to extend via line 200 to the electric motor of fan 44. The opposite input to the electric motor of fan 44 is coupled to line 176. In similar fashion, the opposite side of switch 92 is coupled via line 202 to one input of the electric motor driving fan 46, while the opposite input thereto at line 204 extends to line 176.

Returning to on/off switch 86, line 182 is seen to extend to connector 96. This provides connection via lead 206 to one input to thermostat 70 which lead is incorporated within cable 68. The opposite lead within cable 68 is shown at line 208 extending via connector 96 to line 210. Note that lines 210 and 176 extend to one input of double pole double throw switch 88 which provides current directional sense, as well as energization to the array of thermal devices 78. Switch 88 is shown in an orientation wherein the terminals coupled with lines 212, 214 and 216 are active, line 212 extends via line 218 to connector 151. The opposite lead to that connector is provided at line 216. Line 218 continues via cable 150, line 220 to line 222 which extends to one input of thermal devices 130 and 131. Note that this couples these two devices 130 and 131 in parallel circuit relationship. Line 216 extends through connector 151 and cable 150 to be provided as line 224 extending to an opposite input of thermal device 133. The opposite side of device 133 is coupled via line 226 to one input of thermal device 132 and the opposite side of device 132 is coupled via lines 228 and 230 to the opposite inputs of parallel coupled thermal devices 130 and 131. With the arrangement shown, a series parallel circuit architecture is provided, devices 130 and 131 being coupled in parallel and devices 132 and 133 being coupled in series circuit relationship. By throwing switch 88 to an opposite direction, a reverse current flow sense will be applied to these thermal devices 130–133 to reverse their cooling/heating performance.

FIGS. 9–13 illustrate an adaptation of the apparatus 20 which provides enhanced modularity such that the user can purchase a basic component without the noted array of thermal devices or may elect to combine a basic structure with one or two auxiliary housings containing arrayed thermal or Peltier effect devices. Looking to FIG. 9, as before, the interior of a sleeping compartment is represented generally at 240. Interior 240 is defined, inter alia, by a sidewall 242 containing a vent to ambient air (not shown) and a rear wall 244 having, for example, a 12 volt receptacle 246 which, as before, in the absence of motor operation is providing power from the battery of the vehicle. Air handling apparatus according to the invention is represented in general at 248 removably mounted over the vent in wall 242. Seen in the figure, is the fan support side 250 of a forward housing portion 252. A rectangular fan mount 254 is positioned over an access opening extending through fan support side 250 of housing 252. Somewhat resembling a door, fan mount 254 is shown to be hinged to support side 250 as provided at hinges 256 and 258. Mount 254 is configured with two rectangular fan ports 260 and 262 behind which are mounted respective electric motor driven fans 264 and 266. As before, fans 264 and 266 are pivotally mounted to the fan mount 254. Removably connected to the centrally disposed housing assemblage is a side housing portion represented generally at 268 having an outwardly disposed end wall 270 with a forwardly disposed vent 272 which is illustrated as being closed by a damper assembly 274. However, vent 272 provides for ingress of air within the vehicle interior 240. In similar fashion, the opposite side of the centrally disposed housing components also incorporates a side housing portion represented generally at 276 which extends to a vent containing end wall 278. Mounted below the centrally disposed housing portion is a control housing represented generally at 280 which, as before, supports an on/off switch 282; a Peltier effect d.c. current directional switch 284; a rheostat knob 286; a connector 288 to which is electrically coupled a cable 290 extending to a thermostat 292 mounted on rear wall 244. Another connector 294 at control console 280 is coupled with power cable 296 which extends in turn to fused plug 298. That fused plug 298 is seen inserted within receptacle 246. Next mounted on the forward face 300 of control housing 280 is an on/off switch 302 for controlling electric motor driven fan 264 and a similar switch 304 for effecting energization of electric motor driven fan 266. Connectors are provided in the endwalls of control housing 280 which are configured to receive corresponding plugs or connectors coupled with cables extending from side housings 268 and 276. In this regard, note that endwall 306 of control housing 280 incorporates an electrical connector 308 for receiving thermal device array energization cable 310 extending from side housing 268. Similarly, a cable 312 extends from side housing 276 to control housing 280.

Figure 10:
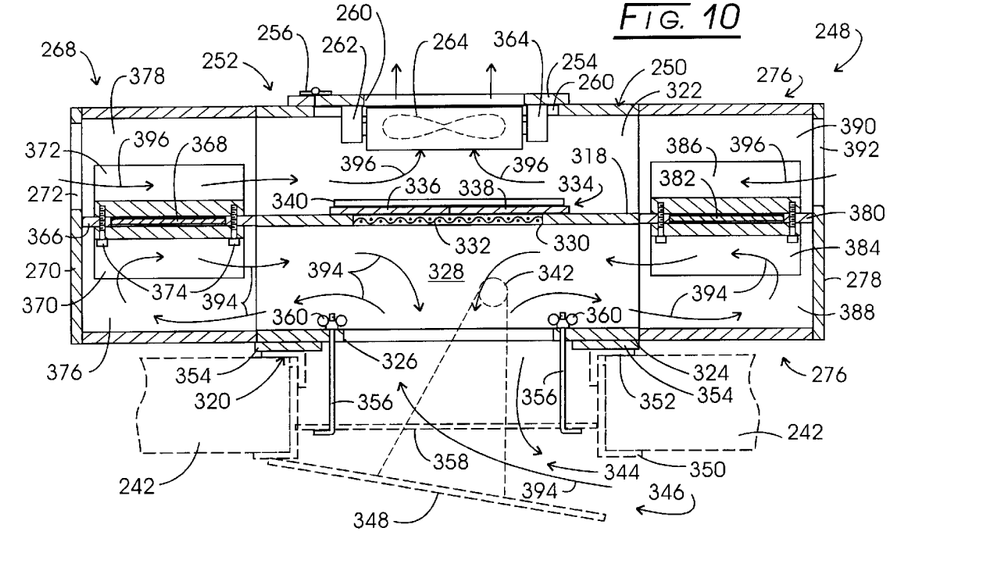
FIG. 10 is a sectional view of the apparatus of FIG. 9.

Referring to FIG. 10, a sectional view of apparatus 248 is revealed. In the figure, the fan support side 250 of forward housing portion 252 is seen to extend from an outward side 318 of a rearward central housing portion represented generally at 320. Accordingly, a forward plenum 322 is defined behind fans 264 and 266.

Rearward central housing portion 320 is seen to have an engagement side represented generally at 324 which is coextensive with the vent against which it abuts and which incorporates a rectangular port 326 and defines a rearward plenum 328 with outward side 318. Outward side 318, in turn, is configured having an access opening 330 within which is installed one or more removable filters 332. Opening 330 may be blocked by hand manipulation of a damper assembly represented generally at 334 and configured as two slidable panels 336 and 338 mounted within channels as at 340. Access opening 330 is dimensioned, inter alia, to permit hand access to the hand graspable portion 342 of the handle 344 of a vent represented generally at 346 extending through sidewall 242 of a vehicle. Note further in this regard that the rectangular port 326 also is dimensioned so as to permit the handle 344 to extend into and be moved from within plenum 328. As before, the vent 346 includes a damper or vane 348 which is connected to the handle 344. Vent 346 further includes an angle-shaped exterior bezel 350 and a corresponding angle-shaped interior bezel 352. A rubber gasket 354 is shown disposed intermediate interior bezel 352 and engagement side 324. Connection of the apparatus 248 against the vent 346 is, inter alia, provided with J-bolts certain of which are identified at 356 which extend through openings within and engage a vent screen 358. J-bolts 356 are configured with thumb nuts as at 360.

Returning to plenum 322, it may be noted that fan 264 is pivotally mounted to fan mount 254 as indicated by the pivot connectors 362 and 364.

Side housing 268 is seen to be configured having a centrally disposed thermally insulative support frame 366 within which an array of Pelthier effect thermal devices are mounted. One such thermal device is seen at 368 in intimate connection with oppositely disposed heatsinks 370 and 372. As before, machine screws as at 374 are employed, inter alia, for providing this heatsink connection. With this arrangement, heatsink 374 is seen to be isolated within a chamber 376 which is in air transfer communication with plenum 328. In similar fashion, heatsink 372 is isolated within a chamber 378. Chamber 378 is seen to be in air transfer communication with plenum 322.

In similar fashion, side housing portion 276 is configured with a thermally insulative support frame 380 within which an array of Peltier effect thermal devices are mounted, one of which is revealed at 382. Device 382 is seen to be connected with oppositely disposed heatsinks 384 and 386. As before, heatsink 384 is isolated within a chamber 388 which, in turn, is in air transfer communication with plenum 328. Heatsink 386 also is positioned in isolation within a chamber 390 which is in air transfer communication with plenum 322. Note that end plate 278 is provided with a vent 392.

For operation with the Peltier thermal devices, the damper components 336 and 338 are closed over access opening 330 and the resultant air flow is represented at arrows 394 indicating that exterior or ambient air is utilized for heat transfer association with heatsinks 370 and 384. On the other hand, as represented at arrows 396, the fans as at 264 draw air from the interior 240 of the vehicle through vents 272 and 382 to be expelled into that interior via fan ports 260 and 262.

Figure 11:
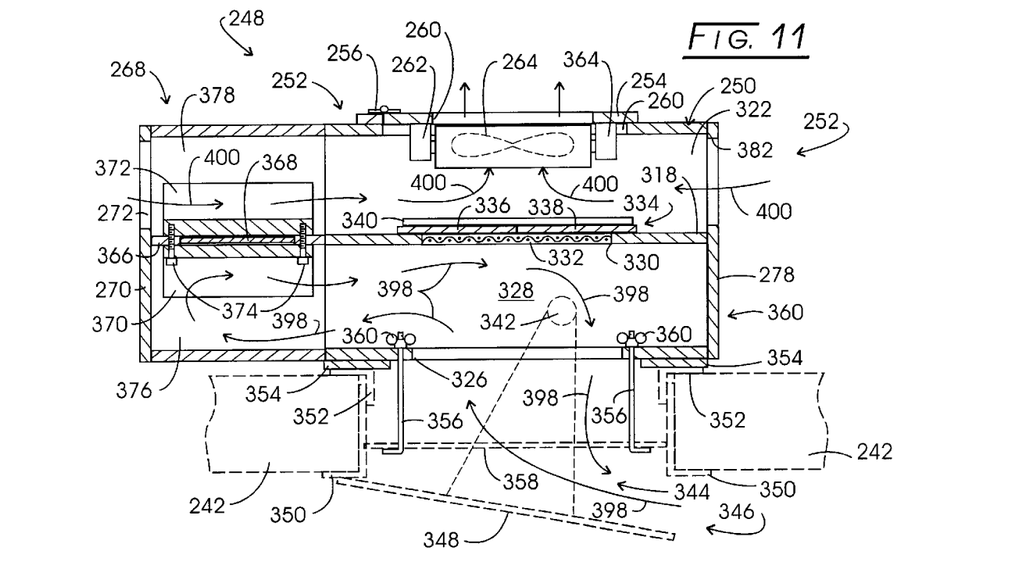
FIG. 11 is a sectional view of the apparatus of FIG. 9 showing the removal of one side housing portion.

FIG. 11 demonstrates one facet of the modularity of the apparatus 248. In this arrangement, the side housing 268 remains with its incorporated array of Peltier effect thermal devices and isolated chambers 376 and 378 in air communication with respective plenums 328 and 322. Damper assembly 334 remains closed. However, side housing portion 276 has been removed and its endwall 278 has been moved into engagement with the side of forward housing portion 252 and rearward central housing portion 320. Extemal ambient air now circulates through vent 346 into and out of plenum 28 as well as chamber 376. This air flow is represented by arrows 398. Interior region 240 air is circulated by energization of fans 264 and 266. The air passes through the vents 272 and 382 and out of fan ports 260 and 262 as represented by arrows 400.

Figure 12:
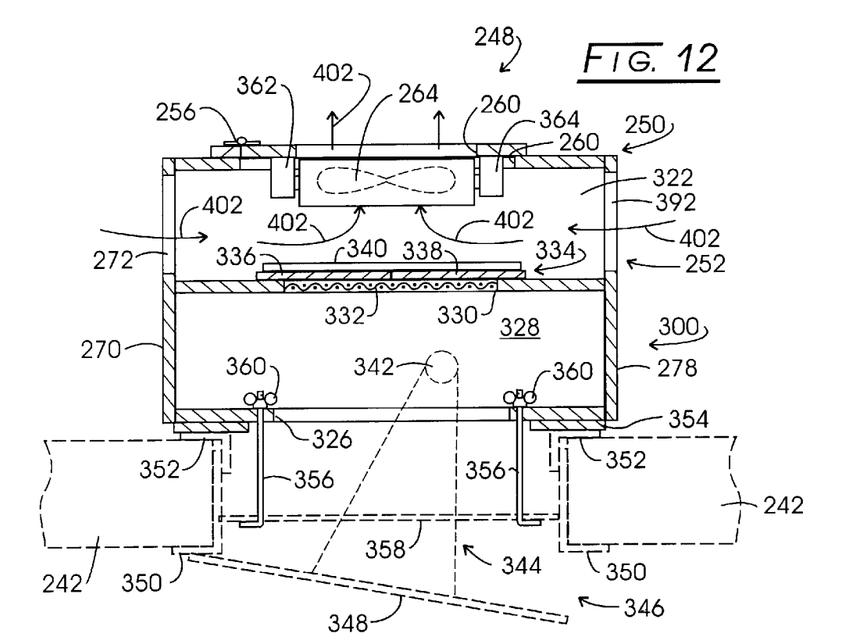
FIG. 12 is a sectional view of the apparatus of FIG. 9 showing the removal of two side housing portions and the closure of a damper assembly at a centrally disposed access opening.

Looking to FIG. 12, the laterally disposed side housings 268 and 276 now are removed and endwalls 270 and 278 are attached to the forward housing portion 252 and rearward housing portion 320 to again establish plenum 322 and plenum 328. With this arrangement as shown, the damper assembly 334 panels 336 and 338 are closing the access opening 330. Accordingly, only air from the interior 240 of the vehicle is circulated under the influence of the electric motor powered fans as at 264. As a consequence, this circulation draws air through forwardly disposed vents 272 and 392 as represented at arrows 402 then outwardly through fan ports as at 260.

Figure 13:
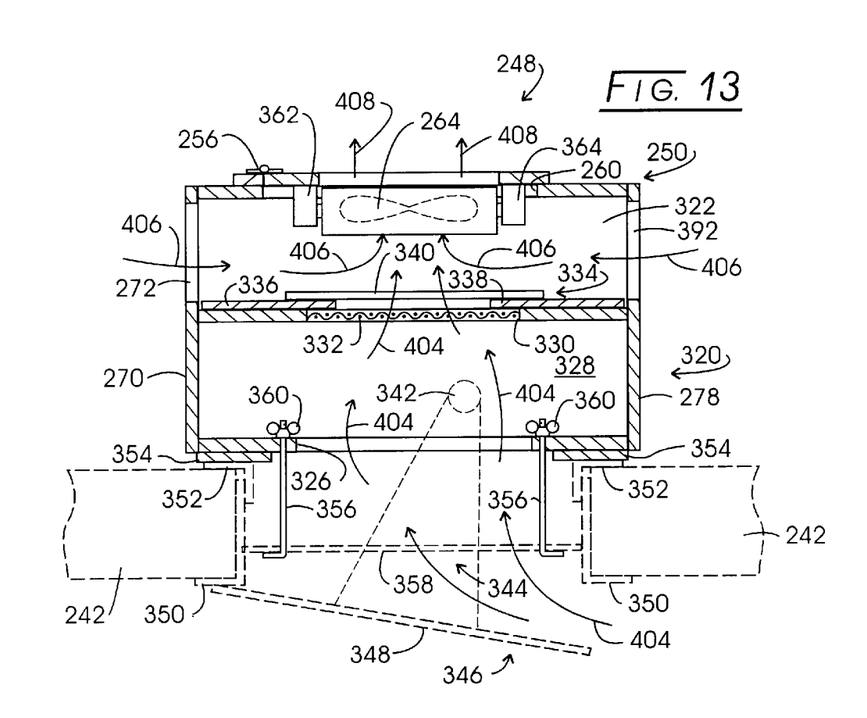
FIG. 13 is a sectional view of the apparatus of FIG. 12 showing the opening of a damper assembly at a centrally disposed access opening.

Looking to FIG. 13, a mixed air circulation can be achieved with the same arrangement by opening the damper assembly 334 such that panels 336 and 338 are spaced apart. As represented at arrows 404, the electric motor driven fans as at 264 will draw exterior or ambient air through vent 346 across port 326, thence through filter 332 and access opening 330. This air, represented by arrows 404, then is admixed with air from the interior 240 being drawn through vents 272 and 392 as represented at arrows 406, the mixed air being driven through the fan ports as represented at arrows 408.

Since certain changes made in the above-described apparatus without departing from the scope of the invention herein involved, it is intended that all matter contained in the description thereof or shown in the accompanying drawings shall be interpreted as illustrative and not in a limiting sense.

What is claimed is:

1. Apparatus for providing air flow within a vehicle with a battery power supply and having a vent for air exchange communication between the vehicle interior and exterior, said vent having an interiorly disposed periphery and a vent handle hand actuable to control said air exchange, comprising:

a first housing portion having an engagement side with a periphery at least co-extensive with said vent periphery and connectable across said vent, a first port within said engagement side in air exchange relationship with said vent, said first housing extending from said engagement side to an output side to define a first plenum, and an access opening within said output side;

a second housing portion positioned upon said first housing portion, having an engagement edge with an edge periphery at least coextensive with said first access opening and in removable abutting contact with said first output side, said second housing portion extending to a fan support side to define a second plenum when said edge periphery is in said abutting contact with said output side, and a fan port within said fan support side;

an electric motor driven fan pivotally mounted to said fan support side at said fan port and pivotal thereat to effect a directional change of air flow driven by said fan when energized; and a control circuit having an input connectable with said vehicle battery power supply and coupling said power supply with said electric motor driven fan to effect said energization.

2. The apparatus of claim 1 in which:

said second housing portion includes an air intake port effective to receive air from said vehicle interior.

3. The apparatus of claim 1 further comprising an air filter removably positioned over said first housing portion access opening.

4. The apparatus of claim 1 in which:

said first plenum is configured to receive a hand graspable portion of said vehicle vent handle; and said first housing portion access opening is configured to provide hand access to said hand graspable portion of said vehicle vent handle.

5. The apparatus of claim 1 in which:

said control circuit further comprises a low battery sensing circuit and an aurally perceptible alarm actuable in the presence of a voltage level at said vehicle battery power supply which is below a predetermined threshold voltage level.

6. The apparatus of claim 1 further comprising a control housing fixed to said first housing first output side, spaced from said access opening and extending outwardly to a pivot support surface aligned with said second housing fan support side to define a pivot position, said second housing portion being pivotally coupled for rotation about said control housing at said pivot position.

7. Apparatus for providing air flow within a vehicle with a battery power supply and having a vent for air exchange communication between the vehicle interior and exterior, said vent having an interiorly disposed periphery and a vent handle hand actuable to control said air exchange, comprising:

a first housing having an engagement side with a periphery at least coextensive with said vent periphery and connectable with said vent, a first port within said engagement side in air exchange relationship with said vent, said first housing extending from said engagement side to an output side to define a first plenum, and an access opening within said output side;

a second housing positioned upon said first housing, having an engagement edge with an edge periphery at least coextensive with said first access opening and in removable abutting contact with said output side, said second housing extending to a fan support side to define a second plenum when said edge periphery is in said abutting contact with said output side, and a fan port within said fan support side;

an electric motor driven fan mounted upon said fan support side at said fan port and energizable to drive air;

an array of thermal devices responsive to a d.c. current input to derive a heated face and a cooled face, a first heatsink coupled in thermal exchange relationship with one said face and an oppositely disposed second heatsink coupled in thermal exchange relationship with a said face opposite said one face, said array being positioned at said access opening, said first heatsink extending into said first plenum and said second heatsink extending into said second plenum; and a control circuit having an input connectable with said vehicle battery power supply, having a fan output coupled in energizing relationship with said electric motor driven fan, and a thermal output conveying said d.c. input to said array of thermal devices.

8. The apparatus of claim 7 in which:

said electric motor driven fan is pivotally mounted to said fan support side.

9. The apparatus of claim 7 in which:

said second housing includes an air intake port effective to receive air from said vehicle interior.

10. The apparatus of claim 7 in which:

said control circuit further comprises a low battery sensing circuit and an aurally perceptible alarm actuable in the presence of a voltage level at said vehicle battery power supply which is below a predetermined threshold voltage level.

11. The apparatus of claim 7 in which:

said array of thermal devices is responsive to said d.c. current of first polarity to effect heating of said second heatsink and is responsive to said d.c. current of second polarity opposite said first polarity to effect cooling of said second heatsink; and said control circuit further comprises a polarity switching assembly actuable to selectively provide said thermal output with said first or second polarity.

12. The apparatus of claim 7 in which:

said array of thermal devices is removably mounted at said access opening; and said first housing access opening is configured to provide hand access to said hand graspable portion of said vehicle vent handle.

13. The apparatus of claim 12 in which:

said array of thermal devices is mountable at said access opening in an orientation wherein said first heatsink extends into said second plenum and said second heatsink extends into said first plenum.

14. The apparatus of claim 7 further comprising a control housing fixed to said first housing first output side, spaced from said access opening and extending outwardly to a pivot support surface aligned with said second housing fan support side to define a pivot position, said second housing being pivotally coupled for rotation about said control housing at said pivot position.

15. Apparatus for providing air flow within a vehicle with a battery power supply and having a vent for air exchange communicaton between the vehicle interior and exterior, said vent having an interiorly disposed periphery and a vent handle hand actuable to control said air exchange, comprising:

a first housing portion having an engagement side with a periphery at least coextensive with said vent periphery and connectable across said vent, a first port within said engagement side in air exchange relationship with said vent, said first housing portion extending from said engagement side to first outward side to define a first plenum, and a first access opening within said first outward side;

a first damper assembly extending about said first access opening manually adjustable to control the extent of air flow therethrough;

a second housing portion extending from said first housing portion to a fan support side to define a second plenum, a second access opening in said fan support side, and a first vent in air exchange communication between said second plenum and said vehicle interior;

an electric motor driven fan pivotally mounted at said second access opening and pivotal thereat to effect a directional change of air flow driven by said fan when energized; and a control circuit having an input connectable with said vehicle battery power supply and coupling said power supply with said electric motor driven fan to effect said energization.

16. The apparatus of claim 15 further comprising:

a fan mount including a fan port pivotally mounted upon said second housing portion fan support side and pivotally movable away from and against said second access opening; and said electric motor driven fan is pivotally mounted to said fan mount.

17. The apparatus of claim 15 further comprising:

a second damper assembly extending about said first vent, manually adjustable to control the extent for air flow therethrough.

18. The apparatus of claim 15 further comprising an air filter postioned over said first housing portion first access opening.

19. The apparatus of claim 16 in which:

said first plenum is configured to receive a hand graspable portion of said vehicle vent handle;

said first housing portion first access opening is configured to provide hand access to said hand graspable portion of said vehicle vent handle; and said second access opening is configured to provide hand access to said first access opening.

20. The apparatus of claim 15 in which:

said control circuit further comprises a low battery sensing circuit and an aurally perceptible alarm actuable in the presence of a voltage level at said vehicle battery power supply which is below a predetermined threshold voltage level.

21. The apparatus of claim 15 in which:

said first damper assembly is configured comprising at least one door slideably moveable to selectively block and unblock said first access opening.

22. Apparatus for providing air flow within a vehicle with a battery power supply and having a vent for air exchange communication between the vehicle interior and exterior, said vent having an interiorly disposed periphery and a vent handle hand actuable to control said air exchange comprising:

a first housing portion having an engagement side with a periphery at least coextensive with said vent periphery and connectable with said vent, a first port within said engagement side in air exchange relationship with said vent, said first housing portion extending from said engagement side to a first outward side to define a first plenum, and a first access opening within said first outward side;

a first damper assembly extending about said first access opening and manually adjustable between a blocking orientation blocking the flow of air through said first access opening and open orientations controlling the extent of the flow of air therethrough;

a second housing portion extending outwardly from said first housing portion to a fan support side to define a second plenum and a second access opening in said fan support side;

a third housing portion extending generally laterally from a first side of said first and second housing portions to a first end wall and having a first chamber in air transfer communication with said first plenum and a second chamber in air transfer isolation from said first chamber and in air transfer communication with said second plenum;

an electric meter driven fan mounted at said fan support side at said second access opening and energizable to drive air;

a first array of thermal devices located within said third housing portion responsive to a first d.c. current input to derive a heater face and a cooled face, a first heatsink coupled in thermal exchange relationship with one said face and an oppositely disposed second heatsink coupled in thermal exchange relationship with a said face opposite said one face, said first heatsink extending into said first chamber and said second heatsink extending into said second chamber;

a first vent located at said first end wall in air exchange communication between said second chamber and said vehicle interior; and a control circuit having an input connectable with said vehicle battery power supply, having a fan output coupled in energizing relationship with said electric motor driven fan, and a first thermal output conveying said first d.c. input to said first array of thermal devices.

23. The apparatus of claim 22 in which:

said electric motor driven fan is pivotally mounted at said second access opening.

24. The apparatus of claim 22 in which:

said control circuit further comprises a low battery sensing circuit and an aurally perceptible alarm actuable in the presence of a voltage level at said vehicle battery power supply which is below a predetermined threshold voltage level.

25. The apparatus of claim 22 in which:

said array of thermal devices is responsive to said d.c. current of first polarity to effect heating of said second heatsink and is responsive to said d.c. current of second polarity opposite said first polarity to effect cooling of said second heatsink; and said control circuit further comprises a polarity switching assembly actuable to selectively provide said thermal output with said first or second polarity.

26. The apparatus of claim 22 further comprising:

a fan mount including a fan port pivotally mounted upon said second housing portion fan support side and pivotally movable away from and against said second access opening; and said electric motor driven fan is pivotally mounted to said fan mount.

27. The apparatus of claim 22 further comprising:

a second damper assembly extending about said first vent, manually adjustable to control the extent for air flow therethrough.

28. The apparatus of claim 26 in which:

said first plenum is configured to receive a hand graspable portion of said vehicle vent handle;

said first housing portion first access opening is configured to provide hand access to said hand graspable portion of said vehicle vent handle; and said second access opening is configured to provide hand access to said first access opening.

29. The apparatus of claim 22 in which:

said first damper assembly is configured comprising at least one door slideably moveable to selectively block and unblock said first access opening.

30. The apparatus of claim 22 further comprising:

a fourth housing portion extending generally laterally from a second side opposite said first side of said first and second housing portions to a second end wall and having a third chamber in air transfer communication with said first plenum and a fourth chamber in air transfer isolation from said third chamber and in air transfer communication with said second plenum;

a second array of thermal devices located within said fourth housing portion, responsive to a second d.c. current input to derive a heated face and a cooled face, a third heatsink coupled in thermal exchange relationship with one said face and an oppositely disposed fourth heatsink coupled in thermal exchange relationship with said face opposite said one face, said third heatsink extending into said third chamber and said fourth heatsink extending into said fourth chamber;

a second vent located at said second end wall in air exchange communication between said fourth chamber and said vehicle interior; and said control circuit further comprises a second thermal output conveying said second d.c. input to said second array of thermal devices.

31. The apparatus of claim 30 in which:

said third and fourth housing portions are configured as modules removably connectable with said first and second housing portions.

\* \* \* \* \*